United States Patent [19]

Evans et al.

[11] 4,157,377

[45] Jun. 5, 1979

[54] PROCESS FOR PRODUCING CALCIUM FLUOBORATE

[75] Inventors: Francis E. Evans, Hamburg; Charles J. Lind, Gowanda; Richard E. Eibeck, Orchard Park; Martin A. Robinson, East Amherst, all of N.Y.

[73] Assignee: Allied Chemical Corporation, Morris Township, Morris County, N.J.

[21] Appl. No.: 939,576

[22] Filed: Sep. 5, 1978

[51] Int. Cl.² .................... C01B 11/24; C01B 35/06
[52] U.S. Cl. .................................................... 423/276
[58] Field of Search .................. 423/276, 277, 293

[56] References Cited

U.S. PATENT DOCUMENTS

| | | | |
|---|---|---|---|
| 2,135,460 | 11/1938 | Loder et al. | 423/293 |
| 2,160,576 | 5/1939 | Loder | 423/293 |
| 2,163,232 | 6/1939 | Baldeschwieler | 423/293 |
| 2,416,133 | 2/1947 | Young et al. | 423/293 |
| 2,697,027 | 12/1954 | Swinehart et al. | 423/293 |
| 2,805,130 | 9/1957 | Wood | 423/293 |
| 2,889,370 | 6/1959 | Schechter | 260/606.5 R |
| 3,018,162 | 1/1962 | Halbedel et al. | 423/276 |
| 3,246,949 | 4/1966 | Ostwald | 423/293 |

FOREIGN PATENT DOCUMENTS 962035 2/1975 Canada.

OTHER PUBLICATIONS

Topchiev et al., *Boron Trifluoride as Catalysts in Org. Chem.* Pergammon Press (1959) pp. 13–24.
Booth, H. S. et al., *Boron Trifluoride and its Derivatives;* John Wiley & Sons, N.Y. 1949; pp. 87–114.
Paris et al., "Bull. Soc. Chim. Fr." 1954 pp. 142–143.

*Primary Examiner*—G. O. Peters
*Attorney, Agent, or Firm*—Jay P. Friedenson

[57] ABSTRACT

Dry calcium fluoborate suitable for use in the manufacture of boron trifluoride is produced by reacting, in an aqueous medium, calcium fluoride, hydrofluoric acid and boric acid followed by removing water from the calcium fluoborate reaction product by purging the reaction product with a dry inert gas such as nitrogen, at a temperature between about 140° to 160° C.

5 Claims, No Drawings

PROCESS FOR PRODUCING CALCIUM FLUOBORATE

BACKGROUND OF THE INVENTION

Boron trifluoride is a well known product useful as an intermediate in the production of a variety of other chemical products such as diborane, which in turn is an intermediate in the production of high energy fuels.

It is known to prepare boron trifluoride by a number of routes. One of such known routes is the thermal decomposition of metallic fluoborates such as calcium fluoborate. Calcium fluoborate in turn can be produced by a number of methods including the known reaction of calcium fluoride, hydrogen fluoride and boric acid in an aqueous medium, as disclosed in U.S. Pat. No. 2,135,460. The products of such reaction are calcium fluoborate and water as by-product.

The production of very dry metallic fluoborate starting material, however, is important in the boron trifluoride process in order to achieve high yields of boron trifluoride. It has been attempted to dry metallic fluoborates such as by heating the reaction product mixture to a high temperature. Unfortunately, although such technique is effective in driving off and removing water, thermal degradation of the metallic fluoborate occurs resulting in substantially diminished yields of the dried metallic fluoborate. These metallic fluoborates are sometimes dried in a vacuum or air circulating or spray dryer (Booth et al. "Boron Trifluoride and Its Derivatives", John Wiley & Sons, 1949, pgs. 87–114, especially page 111 which refers to the drying of a metallic fluoborate salt by air drying). Unfortunately, such techniques increase costs due to the additional drying operations required and, in addition, suffer the disadvantage of extending production time cycles. Similarly, a variety of dessicants have been employed such as phosphorus pentoxide, but these suffer from the same disadvantages of air or spray drying.

It is accordingly an object of this invention to provide a simple, economical process for obtaining dry calcium fluoborate, in high yields, without suffering from any of the above described disadvantages.

Other objects and advantages of the invention will become apparent from the following description.

SUMMARY OF THE INVENTION

We have found that the objects of the invention may be accomplished by following the below described process improvement in the known process for preparing calcium fluoborate by reacting, in an aqueous medium, calcium fluoride, hydrogen fluoride and boric acid.

$$CaF_2 + 2H_3BO_3 + 6HF \rightarrow Ca(BF_4)_2 + 6H_2O$$

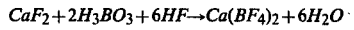

The improvement comprises removing water from the calcium fluoborate reaction product by purging the reaction product with a dry inert gas at a temperature between about 140° to 160° C. The procedure is simple, requires no substantial extra capital for equipment and does not substantially extend production time cycles. By this technique high yields of extremely dry calcium fluoborate are obtained. These results were surprising since similar results are not obtained when the same technique is applied to the preparation of other metallic fluoborate salts such as zinc fluoborate, nickle fluoborate and cobalt fluoborate. We have no reasonable explanation for this phenomenon.

DETAILED DESCRIPTION OF THE INVENTION

As previously mentioned, the basic reaction of calcium fluoride, hydrogen fluoride and boric acid to produce calcium fluoborate is well known.

Ideally, if all the reactants could be initially charged to the reactor in the dry state, it would be necessary only to remove the water of reaction in order to produce dry calcium fluoborate. Anhydrous hydrofluoric acid, however, is not as easily reacted with a mixture of dry calcium fluoride and dry boric acid at atmoshperic pressure as is dissolved hydrofluoric acid. Under pressure or with proper equipment design, reaction of such dry ingredients is feasible.

The process of the invention is capable of efficiently removing water at atmospheric conditions, whether in such a process charged with the reactants or formed as the water of hydration. Any aqueous solution of HF may be employed. HF is available commercially in concentrations from about 48 to 70 weight % concentration. These are suitable for use in the invention process. Preferably, HF concentrations in aqueous solution should be from about 60 to 70 weight %.

Calcium fluoride from any source, including technical grade, is suitable for use in accordance with the invention process. It is preferred, however, to use calcium fluoride in finely divided form. Finely divided calcium fluoride affords a smoother reaction with the boric acid and the hydrofluoric acid. Accordingly, if commerical grade calcium fluoride is to be employed, it is preferred to grind same in a ball mill or some other suitable mill before use to reduce the particles to the more suitable finely divided powder form. Generally, the more finely divided the calcium fluoride powder the better and the smoother the reaction. A coarse form of calcium fluoride can cause bumping in the reactor, splashing of the melt into the condenser, plugging and pressure build-up in the reactor. Finely divided calcium fluoride also produces a crystalline calcium fluoborate product as opposed to a higher density sandy type calcium fluoborate type particle which would be produced if a coarser grade of calcium fluoride were used. Both types of calcium fluoborate produced, however, are suitable for use in the manufacture of boron trifluoride, if sufficiently dry. Preferred particle size ranges for the calcium fluoride are about 40 to about 1,000 microns. Most preferred are particle size ranges of about 40 to about 250 microns.

Any convenient source of boric acid reactant may be employed. The water solubility of boric acid is so high as to make the physical form of the boric acid source immaterial.

The subject reaction to form calcium fluoborate is a typical equilibrium reaction. Distilling off the water of reaction forces the reaction towards completion, thereby improving the yields of the desired calcium fluoborate product. Water will commence distilling off from the reaction mixture under atmospheric conditions at a temperature of about 104° C. If sufficient heat is applied to the reaction, the temperature will rise quite smoothly to 170° C. over a period of about 6 to 7 hours. The calcium fluoborate product recovered in such a manner will be substantially anhydrous, containing less than about 2% water. Yields, however, will be only about 80% of theory due to the thermal degradation of calcium fluoborate at this elevated temperature.

If the reaction mass is held at a temperature between about 142° to 145° C. until no more water distills over, thermal degradation can be held to a minimum. However at this lower temperature, only about 65-70% of theory of water is removed and only about a 70% theoretical yield of product is obtained.

According to the invention process it has been discovered that almost theoretical amounts of water can be removed and over 95% theoretical yields of 100% calcium fluoborate obtained if water is removed from the calcium fluoborate reaction product by purging the reaction product with a dry inert gas at a temperature between about 140°-170° C., preferably between about 140°-160° C., and still preferably between about 140°-150° C.

Any dry inert gas may be employed. Nitrogen or air is preferred but other suitable inert gases include argon, neon, helium, carbon dioxide, sulfur hexafluoride and carbon tetrafluoride.

In operation, water is distilled from the reaction mass under a continuous inert gas purge while maintaining the reaction mass at the desired temperature. The purge is conducted by slowly introducing the dry inert gas into the reactor and out the condenser during the entire heating cycle. The time required for the purge varies depending upon the amount of water present but usually varies between about 10-15 hours. Completion of dehydration through the inert gas purge is signalled when the batch temperature breaks upwardly.

EXAMPLES

The following procedure was used to prepare calcium fluoborate excepting that various operating parameters and reactants were varied as indicated in the Table.

Into a tared 500 ml. capacity Teflon reactor equipped with a Teflon gasket between the head and shell, Teflon sleeve-covered Inconel hook agitator, Teflon thermowell and polyethylene fittings to a downward Inconel water condenser and tared plastic bottle as a receiver, were charged 367.5 gms. (9 moles) of a 49% aqueous solution of HF. An icebath was used to cool the acid solution to about 10° C. and the solution was agitated. Over a period of about ½ hour, 185.6 gms. (3 mole) of 99.5% strength boric acid crystals were added through a plastic funnel into the agitated HF solution, while the slurry temperature was held below 40° C. by means of the icebath. The resulting white crystalline slurry was then agitated for about 10 minutes without the ice bath. At the end of this period 119.5 gms. (1.5 moles) of about 60-300 mesh (50-250 microns) calcium fluoride powder (reagent grade) were rapidly added through a plastic funnel. The receiver was then packed in an icebath. A slow continuous stream of dry nitrogen was started through the reactor over the surface of the reaction mass and exited out the top of the receiver. Heat was supplied to the reaction mass and the temperature was maintained between about 142°-145° C. while the nitrogen purge was continued and water was being distilled off. After about 5 to 6 hours the batch temperature broke sharply upwardly signaling completion of dehydration. The reaction mass was continued to be heated allowing the temperature to rise to a maximum of 150° C. This temperature was maintained for several minutes until there was no longer any drippage from the water condenser. This was to insure removal of trace amounts of water. The agitator was then raised completely out of the reaction mass to prevent freezing of the agitator in the solid reaction mass upon cooling. The batch was then allowed to air cool to about 110° C. and was then cooled to 25° C. by means of a water bath and an icebath. Nitrogen purging was then discontinued. The reactor was opened and quickly weighed and, without delay, the dried hard white crystalline calcium fluoborate cake was removed and transferred into a tared polyethylene bottle. The bottle was tightly covered and weighed. It is important that the extremely deliquescent calcium fluoborate be exposed to the air as little as possible to avoid moisture pick-up. The calcium fluoborate recovered was a white granular, crystalline material which was hard-packed at the bottom and required chiseling to remove. The yields of calcium fluoborate product and the water remvoed and remaining in the product are shown in the Table.

TABLE

| Example | Fluoborate Prepared | Change in Procedure | % Theoretical[1] Total $H_2O$ Distilled Off | Estimated[2] % $H_2O$ Left in Fluoborate Solids | % Strength[3] | % Product Yield | % Fluoborate Yield[4] |
|---|---|---|---|---|---|---|---|
| 1 | $Ca(BF_4)_2$ | None | 101.0 | 0.0 | 96.0 | 99.3 | 95.4 |
| 2 | $Ca(BF_4)_2$ | No $N_2$ purge | 67.0 | 28.0 | 51.0 | 139.0 | 71.0 |
| 3 | $Ca(BF_4)_2$ | Reaction temperature 170° C. | 99.9 | 0.0 | 83.4 | 95.8 | 80.1 |
| 4 | $Ca(BF_4)_2$ | Reaction temperature 170° C. and no $N_2$ purge | 101.0 | 0.0 | 83.2 | 96.4 | 80.8 |
| 5 | $Zn(BF_4)_2$ | Substituted $ZnF_2$ for $CaF_2$ and reaction temperature 150° C. | 58.8 | 36.2 | No analysis | | No analysis |
| 6. | $Zn(BF_4)_2$ | Substituted $ZnF_2$ for $CaF_2$. Reaction temperature 150° C. and no $N_2$ purge | 58.5 | 34.5 | No analysis | | No analysis |
| 7 | $Zn(BF_4)_2$ | Substituted $NiF_2$ for $CaF_2$ and reaction temperature 145° C. | 58.5 | 34.5 | No analysis | | No analysis |
| 8 | $Ni(BF_4)_2$ | Substituted $NiF_2$ for $CaF_2$. Reaction temperature 150° C. and no $N_2$ purge | 56.8 | 35.6 | No analysis | | No analysis |
| 9 | $Co(BF_4)_2$ | Substituted $CoF_2$ | 51.4 | 32.1 | No | | No |

TABLE-continued

| Example | Fluoborate Prepared | Change in Procedure | % Theoretical[1] Total H$_2$O Distilled Off | Estimated[2] % H$_2$O Left in Fluoborate Solids | % Strength[3] | % Product Yield | % Fluoborate Yield[4] |
|---|---|---|---|---|---|---|---|
|  |  | for CaF$_2$ and reaction temperature 150° C. |  |  | analysis |  | analysis |
| 10 | Co(BF$_4$)$_2$ | Substituted CoF$_2$ for CaF$_2$. Reaction temperature 150° C. and no N$_2$ purge | 44.0 | 35.9 | No analysis |  | No analysis |

[1] Based on actual distillate obtained against theory based on H$_2$O from HF and from the water of reaction.
[2] Based on weight of product present in excess of that expected for the Ca)BF$_4$)$_2$ and the slight excess of CaF$_2$.
[3] Determined by titrating with tetraphenyl arsonium chloride which precipitates fluoborate. Endpoint was measured using a fluoborate specific electrode.
[4] Determined by multiplying product yield (weight of product divided by the weight of Ca(BF$_4$)$_2$ expected from the HBO$_3$ used) by the strength of the fluoborate.

It can be seen from Examples 1 and 3 that with the nitrogen purge, extremely dry calcium fluoborate product was obtained. When temperatures were maintained at 150° or below, excellent yields of product were obtained. A substantial sacrifice in yield results when temperatures over 170° C. are employed.

In the same experiments, but without the nitrogen purge, (Examples 2 and 4) either the water removed is substantially diminished or the yield falls below satisfactory levels.

Examples 5-10 inclusive show that similar results as obtained for calcium fluoborate with nitrogen purge were not obtained for zinc fluoborate, nickel fluoborate and cobalt fluoborate. In these examples, products obtained with or without nitrogen purge were wet and unacceptable and accordingly yields were not calculated.

We claim:

1. In the process for preparing Ca(BF$_4$)$_2$ by reacting, in an aqueous medium, CaF$_2$, HF and H$_3$BO$_3$; the improvement which comprises removing water from the Ca(BF$_4$)$_2$ reaction product by purging the reaction product with a dry inert gas at a temperature between about 140° to 170° C.

2. The process according to claim 1 in which the purging is carried out at about 140°-160° C.

3. The process according to claim 1 in which the purging is carried out with dry nitrogen.

4. The process in accordance with claim 3 in which the purging is carried out at about 140°-160° C.

5. The process in accordance with claim 4 in which the purging is carried out at about 140°-150° C.

* * * * *